INVENTORS.
CHARLES A. NEUENDORF,
DONALD C. BLACK
BY Harry A. Herbert Jr
Julian L. Siegel
ATTORNEYS

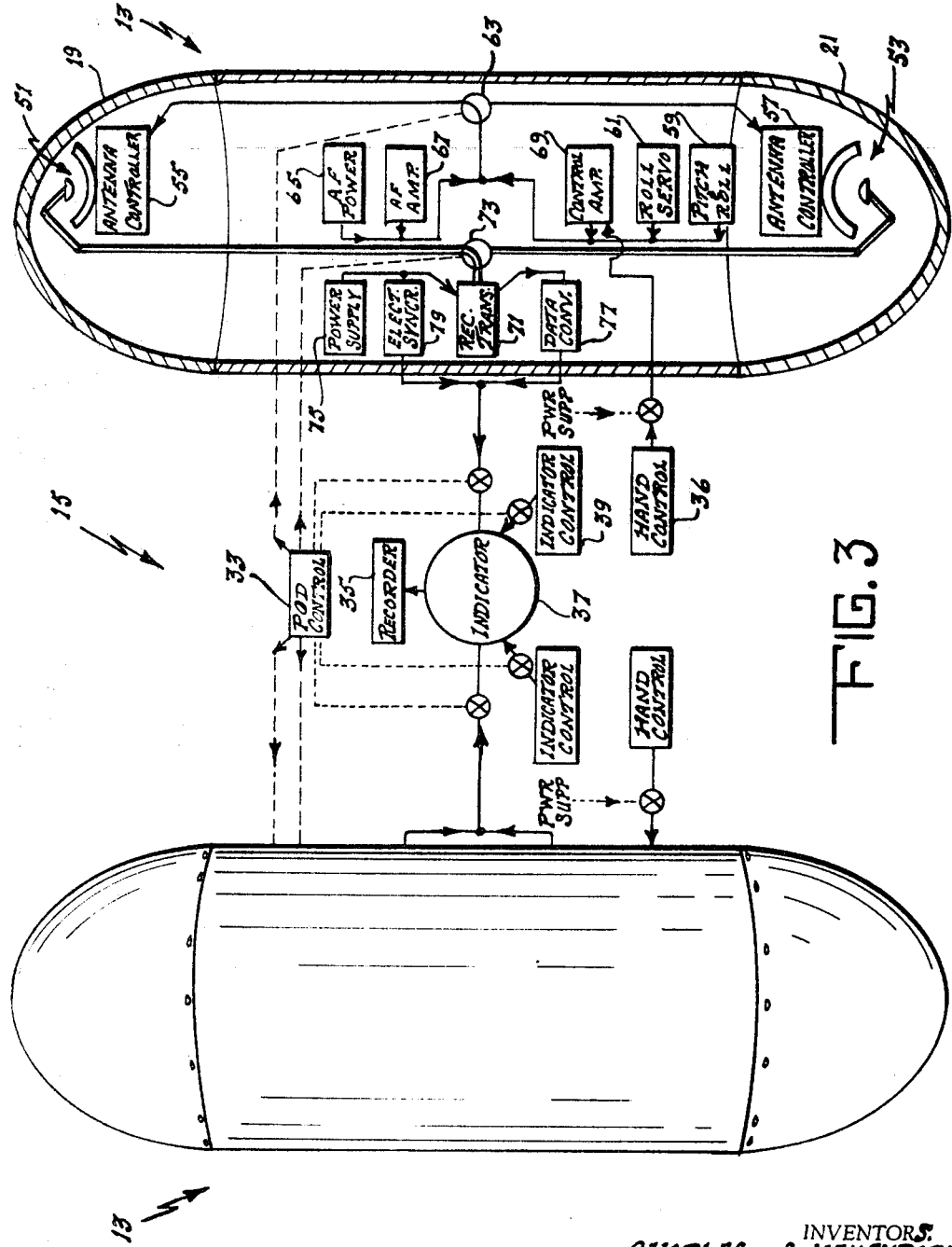

United States Patent Office 3,440,654
Patented Apr. 22, 1969

3,440,654
AIRBORNE INTERCEPTOR RADAR TESTING SYSTEM
Charles A. Neuendorf, San Diego, and Donald C. Black, Upland, Calif., assignors to the United States of America as represented by the Secretary of the Air Force
Filed Mar. 12, 1968, Ser. No. 712,400
Int. Cl. G01s 7/40
U.S. Cl. 343—17.7        3 Claims

ABSTRACT OF THE DISCLOSURE

A system for testing the jamming ability of an aircraft using two pods mounted on the wings of a testing aircraft, each pod containing a radar, a forward and aft antenna, the choice of antenna and the mode of operation of the chosen antenna being controlled by the testing aircraft's radar operator.

Background of the invention

The invention relates to radar testing systems and more particularly to the airborne testing of the jamming ability of an interceptor radar.

After a defensive electronics system is installed in an aircraft, it is important to know if it is operating properly. Unlike the test of most electronic equipment a defensive electronic aircraft's final equipment test comes only in a hostile environment, where effectivenes of results can never be obtained. The nature of the defensive electronic system is such that many undetermined problems arrive after installation. Of particular interest is whether the proper power with the correct parameters arrive at the threat radar at the proper time to induce the desired results and at what range and azimuth does the equipment furnish protection to the defensive aircraft. Also, in any defensive electronic system, security is a prime importance which can be endangered if many coordinating flight agencies are required to support a test. To overcome the above shortcomings, this invention readily tests the effectiveness of any defensive electronic aircraft jamming equipment. It does this in one flight with no assistance from any external organizations.

Summary of the invention

The invention is the device which can radiate an airborne interceptor radar signal from an aircraft while in flight 360° around itself. It consists of two external pods, each pod having an airborne interceptor radar. Each radar has two antennas, one forward and one aft. Each pod, therefore, is a radar itself and is capable of radiation from the front or rear antenna when electronically switched from the cockpit. The two pods are installed on the testing aircraft and are operated by a radar observer flying in the cockpit where he has the option of: (1) selecting the left and right pod; or (2) selecting the front and back antenna, thus giving 360° of radar coverage. After these selections the radar is operated in the normal manner and illuminates selected targets that are to be tested. This arrangement allows an aircraft that is to be evaluated to be radiated with airborne interceptor energy for all angles and ranges for an extended period of time. A single omnidirectional antenna would not be staisfactory as it would incur structural problems which the present invention obviates.

It is therefore an object of this invention to provide a radar system that can radiate airborne interceptor radar energy 360° about itself.

It is another object to provide an airborne radar tester that can fly in almost unlimited relative positions from the defensive aircraft being tested while radiating an airborne radar signal upon it.

Brief description of the drawings

FIGURE 3 is schematic and block diagram of the system showing details of a single pod.

Description of the preferred embodiment

Figure 1:
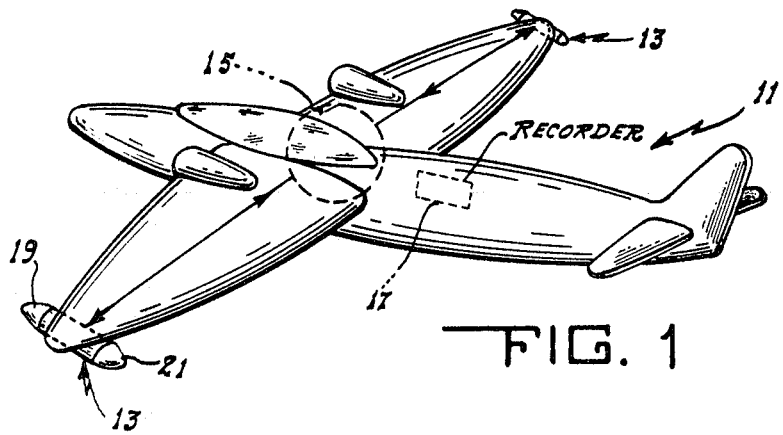
FIGURE 1 shows the radar pods and their location in the testing aircraft.
Figure 2:
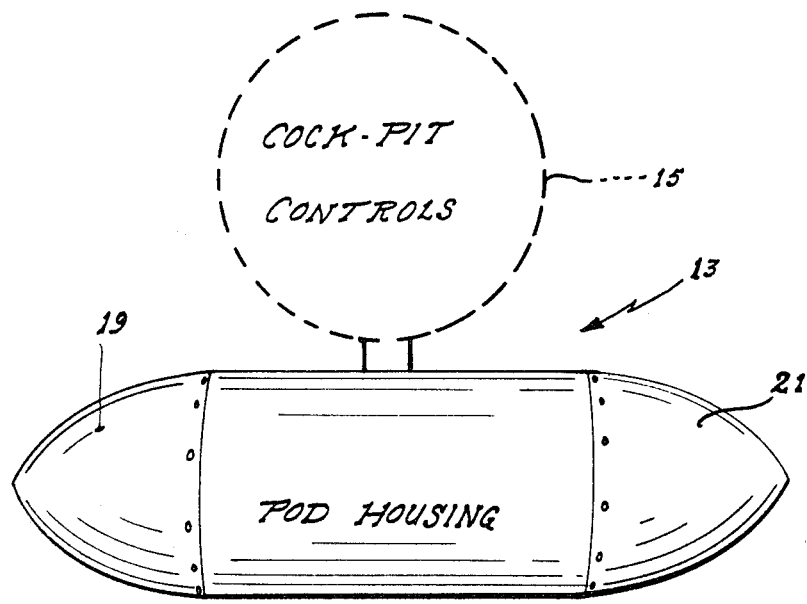
FIGURE 2 is a schematic diagram of that shown in FIGURE 1.

Referring to FIGURES 1 and 2 the invention consists of an airframe 11, such as a B-57, modified to include two identical wing-tip mounted pods 13, a radar observer's position 15, and a tape recorder system 17. Each pod contains an airborne interceptor radar and two associated antennas. One is mounted facing forward at 19 and the other is mounted facing aft at 21. The radar observer's position contains controls for selecting the right and left pod and the forward and aft antenna therein. It also contains controls and indicators to operate the airborne interceptor's radar and to search for and track airborne targets and to operate the recorder. Test recorder 17 records pertinent data during the testing flight for analysis at a later date.

The radar used in this invention is an airborne interceptor radar and with a radar observer is capable of automatically searching for aerial targets, detecting these targets and automatically tracking these targets. Two complete radar systems are included in this system, one on each pod. These radars are identical; therefore, throughout the rest of the description only one radar is discussed.

The system employs three basic modes of operation: automatic search, manual search, and automatic track. Two auxiliary modes, beacon and ground map, are available for navigational use. During automatic search, the antenna scans a selected sector ahead of the aircraft in a rectangular two-bar scan pattern. Targets detected within this sector are presented to the pilot on a display such as the type-B display on the flight indicator. A range sweep trace, coordinated with each sweep of the antennas, moves back and forth across the face of the indicator screen. Targets are displayed as bright spots, the vertical positions of which represent target range, and the horizotal positions of which indicate target azimuth. After a target has been selected during automatic search, manual search is employed to establish lock-on in range and angular position. To place the system in manual operation, the pilot depresses a switch on the handle of the antenna control. Then, by moving the control handle, he positions the antenna to the radiated beam as focused on the target. The range-gate marker, which is a wedge-shaped spot of light along the range-sweep trace, enables the pilot to effect lock-on in range to the target. The vertical position of the marker along the edge of the sweep trace corresponds to the range of which the range tracking circuits will lock-on and track the target. The operator employs a switch on the antenna control to move the range gate marker down or up (in or out in range) until it coincides with the target indication. At this point lock-on occurs and automatic track begins. During automatic track, the radar system maintains lock-on to the target and presents the target on the B-scope in range, azimuth, and elevation.

Referring to FIGURE 3 the radar operator in the aircraft can select with control 33 either the right or left pod and can also select forward antenna 51 or aft antenna 53. The position of the antennas is controlled by antenna controls 55 and 57. Pitch and roll unit 59 and roll servo 61 is fed to the antenna through switch 63 to compensate for the pitch and roll of the testing aircraft. Power for the antenna control is derived from AF power supply 65 and AF amplifier 61. The antennas can be manually operated with antenna hand control 36 which controls control amplifier 69. The radar signals are coupled to receiver-transmitter 71 through directional coupler 73. Power supply 75 feeds receiver-transmitter 71. Indicator 37 receives data from receiver-transmitter 71 through signal data converter 77 while synchronizer 79 synchronizes receiver-transmitter 71 and indicator 37. Indicator 37 is controlled by indicator control 39 and its output is fed to recorder 35 for permanent record and later analysis.

The invention thus shows a radar system having two pods each pod having two antennas with each antenna having a coverage of one quadrant thereby obtaining 360° coverage about the testing aircraft for the entire system.

All the components discussed in the above description are conventional, well-known in the art, and the details can be found in publications such as the Air Force handbook of the APG–33/E–4 radar systems.

We claim:

1. A system for determining jamming ability of a defensive electronics aircraft by an airborne testing aircraft comprising:
   (a) A pair of radar pods having radar coverage of 360° about the aircraft, one each of the pods located at the lateral extremities of the testing aircraft, each pod including:
      (1) a pair of antennas, one forward in the pod and one aft in the pod, each antenna having a coverage of one quadrant;
      (2) a radar receiver-transmitter;
      (3) means for selectively connecting the radar receiver-transmitter to each of the antennas, permitting radiation of substantially 180° about the testing aircraft upon the airborne defensive aircraft;
      (4) and means for controlling the scan of the antennas;
   (b) an indicator fed by the radar receiver transmitters;
   (c) and a recorder fed by the indicator.

2. A system for determining jamming ability according to claim 1 which further includes a pitch and roll control connected to the antenna for compensating for the pitch and roll of the testing aircraft.

3. A system for determining jamming ability according to claim 2 which further comprises an antenna hand control connected to the antenna to effect lock-on.

References Cited

UNITED STATES PATENTS 3,155,971  11/1964  Hansel _____ 343—12

RICHARD A. FARLEY, *Primary Examiner.*

T. H. TUBBESING, *Assistant Examiner.*